Patented Jan. 16, 1934

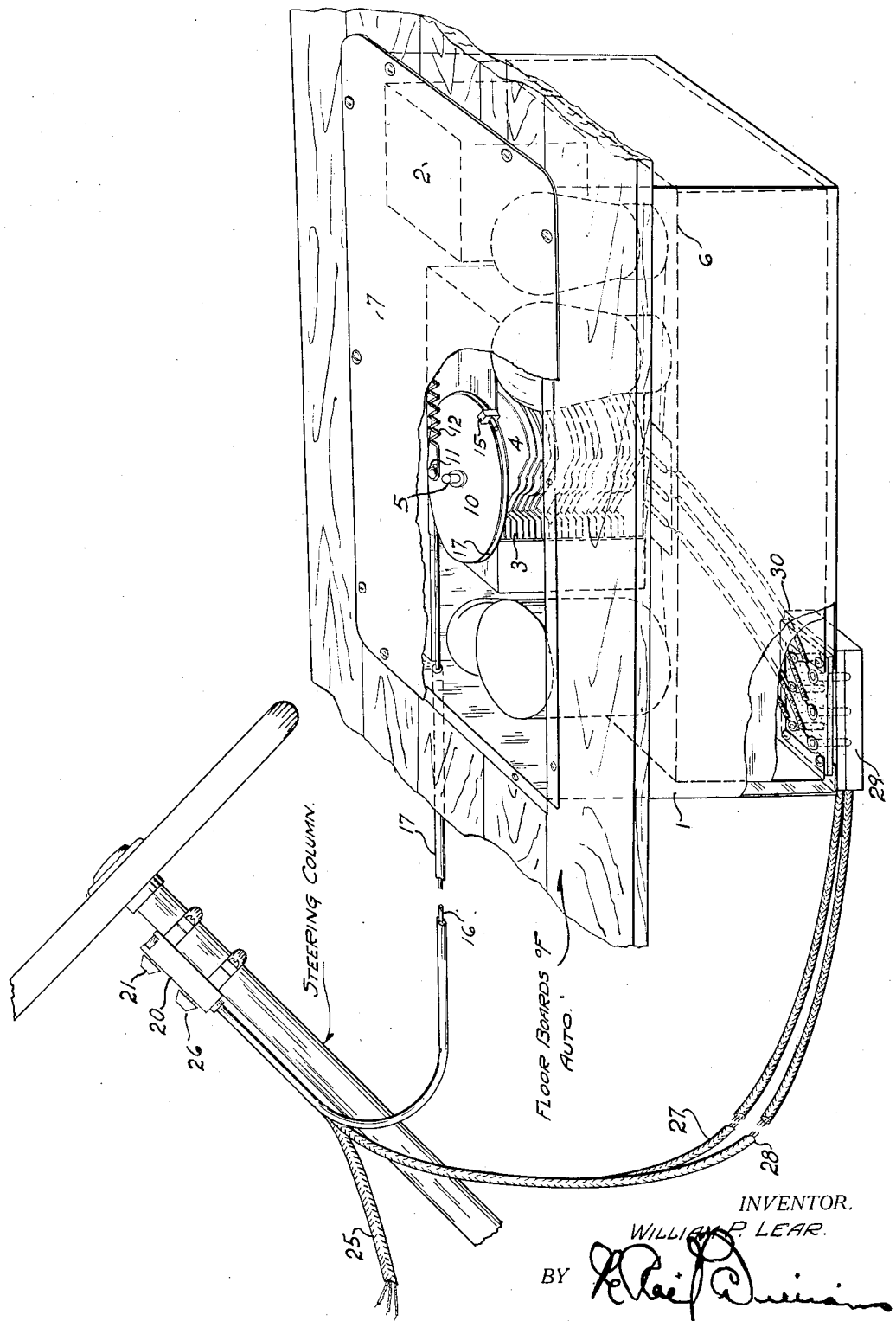

1,944,139

UNITED STATES PATENT OFFICE 1,944,139

RADIO APPARATUS

William P. Lear, Chicago, Ill., assignor to Grigsby-Grunow Company, Chicago, Ill., a corporation of Illinois Application August 3, 1931. Serial No. 554,751

3 Claims. (Cl. 250—14)

This invention relates to radio receivers, particularly of the portable type used in automobiles and other similar vehicles. In installations of this character, it is desirable that the receiver itself be disposed in any place available therefor, and a remote control located within easy reach of the operator be provided.

In installations of this character, particularly in automobiles, considerable vibration and jarring occurs. The usual radio set, with the variable condensers mounted so that the axis is horizontal during normal operation of the set, is particularly sensitive to such jarring and frequently results in a change of condenser adjustment.

I have determined that this trouble is eliminated by disposing the gang condenser of the usual radio set in a vertical position. Practically all the jars and bumps, therefore, are taken up by the bearings of the condenser and have no tendency to throw the condenser out of adjustment.

Furthermore, the vertical position of the condenser in general makes for a more efficient disposition of the remote control apparatus with relation to the condenser itself. Practically all of the remote control apparatus used on such sets involves the use of a species of flexible cable, which must be brought to the condenser shaft. By providing this particular type of mounting of the condenser, it is possible to so dispose the control unit with reference to the condenser as to have a minimum amount of sharp bends and turns in the control cable.

This invention is also concerned with the mounting of the radio in said vehicle. In mounting a set of this character, it is necessary to protect the set from water, sand and other elements encountered by anything suspended underneath an automobile where such set is usually disposed.

A container, preferably metallic, for shielding purposes, is permanently fastened to the automobile, preferably suspended from the bottom of the floor boards of an automobile. Into this container there is disposed a complete radio set mounted as a unit on a chassis. Such a mounting is desirable for the reason that tube replacements and service are facilitated.

The set is energized from any suitable source of potential, usually the storage battery of the automobile and a separate battery for the plate supply of the tube. Various connections between these sources of potential and the set must be made through said outer protecting casing. It is clear that if an ordinary cable is passed through the casing, repeated removals of the set from its container will result in sufficient clearance between the cables and the container wall to admit water, sand, or other undesirable elements. In order to avoid this, I preferably provide a detachable connection, one part permanently fastened to the casing and the other part permanently fastened to the chassis. This detachable connection may consist of any suitable plug and socket arrangement, having as many terminals as may be found desirable. With such a detachable connection, a complete chassis may be removed and replaced as often as desired, without in any way endangering the scope of protection afforded by the casing.

Referring to the drawing, the figure shows a radio set embodying the inventions herein disclosed mounted in an automobile.

Suspended underneath the floor boards of an automobile, through a suitable aperture, is a casing 1, preferably of metal, in which normally rests a radio receiving set, generally designated by numeral 2. This set includes the usual elements such as transformers, vacuum tube, tube sockets, and the like, and in particular includes a tuning element, here shown as a gang condenser 3. In accordance with the usual practice, the gang condenser is provided with a rotor 4, rigidly mounted upon a shaft 5. The entire radio apparatus is mounted on a chassis 6, and is adapted to be removed as a unit from casing 1 upon the removal of cover 7.

The tuning condenser is mounted so that the rotor shaft 5 is vertically disposed during the normal disposition of the set in the automobile. In order to actuate condenser 3, a pulley 10 is rigidly fastened to the upper portion of rotor shaft 5. Pulley 10 is provided with a pin 11, to which is anchored one end of a coil spring 12. The other end of the coil spring may be suitably anchored to a fixed portion of the set, so that there will be a tendency for the condenser to assume a position of either minimum or maximum capacity—in this instance, the latter. Pulley 10 is also provided with an anchor block 15 disposed on the periphery thereof, into which is anchored one end of a cable 16. This cable is disposed in a groove 17 in the periphery of pulley 10 and extends out through the side of casing 1. Cable 16 is preferably disposed in a sheath 17, and the entire assembly brought to a control unit 20, here shown as mounted on the steering column of an automobile. The control unit is provided with a suitable means 21 for imparting longitudinal motion to cable 16. It is clear that by actuating the means 21, here shown as a control knob, rotor 4 may be suitably adjusted in any desired position with respect to the fixed plates of condenser 3.

In order to energize the set, it is desirable to have suitable connections to current supplies, which may, in practice, be the automobile storage battery and a separate battery for energizing the plate circuits of the vacuum tubes. Connection is made by means of a cable 25 leading to a combined volume control and switch 26 of control unit 20. From the control unit a pair of cables 27 and 28 lead to a socket member 29, rigidly fastened in the bottom of casing 1. Socket member 29 is tightly sealed in casing 1 so that no water or dirt can enter inside of the casing. Disposed on chassis 6 is a co-operating plug member 30, which is adapted to make a connection with socket member 29 when the chassis is in the normal position in casing 1. Various wires from the plug 30 go to the several pieces of apparatus comprising the radio set. When the radio chassis is removed from casing 1, the plug 30 is automatically withdrawn from socket portion 29. Suitable means may be provided for rigidly maintaining chassis 6 within casing 1.

The matter herein disclosed with reference to the vertical mounting of the condenser, is disclosed and claimed in a separate copending application of mine, filed of even date herewith.

I claim:

1. In combination with the floor board of a vehicle, the bottom of said floor board being exposed to the weather, a radio chassis comprising a metallic container, said container having a flange around the opening thereof over which a cover is adapted to fit, said container being disposed in an opening of said floor board with the flange on the protected side of said floor board projecting beyond the edges of said board opening, radio instrumentalities removably disposed as a unit in said container, a control cable leading from said container, said cable being permanently sealed to said container and terminating on the inside thereof in a plug, and a cooperating plug on said radio unit adapted to connect with said plug on the container when said radio unit is in said container and disconnect therefrom when said unit is removed.

2. The structure of claim 1 in which said radio unit includes a gang condenser mounted with the axis perpendicular to the plane of the floor board.

3. The structure of claim 1 in which said radio unit includes a gang condenser mounted with its axis perpendicular to the plane of the floor board, the top end of said condenser being adjacent to the opening of said container, a remote control of the flexible cable type, and means for connecting said cable through the container wall with the top end of said condenser.

WILLIAM P. LEAR.